(12) United States Patent
Kang et al.

(10) Patent No.: US 9,008,915 B2
(45) Date of Patent: Apr. 14, 2015

(54) FOUR-WHEEL STEERED VEHICLE AND TORQUE DISTRIBUTION CONTROL METHODS FOR SAME

(71) Applicant: Honda Motor Co., Ltd., Minato-ku, Tokyo (JP)

(72) Inventors: Xiaodi Kang, Dublin, OH (US); Christopher J. Cymbal, Marysville, OH (US); David A. Thompson, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 92 days.

(21) Appl. No.: 13/765,768

(22) Filed: Feb. 13, 2013

(65) Prior Publication Data

US 2014/0229071 A1 Aug. 14, 2014

(51) Int. Cl.
*B60W 10/20* (2006.01)
*B60W 30/02* (2012.01)
*B62D 6/00* (2006.01)
*B60W 10/14* (2012.01)
*B62D 7/15* (2006.01)

(52) U.S. Cl.
CPC ............... *B60W 30/02* (2013.01); *B60W 10/14* (2013.01); *B60W 10/20* (2013.01); *B60W 2600/00* (2013.01); *B62D 6/002* (2013.01); *B62D 7/159* (2013.01)

(58) Field of Classification Search
USPC .................. 701/42, 69, 89; 180/245
See application file for complete search history.

(56) References Cited

U.S. PATENT DOCUMENTS

| | | | |
|---|---|---|---|
| 5,297,646 A * | 3/1994 | Yamamura et al. ........... 180/415 |
| 5,742,918 A | 4/1998 | Ashrafi et al. | |
| 5,878,357 A | 3/1999 | Sivashankar et al. | |
| 6,553,293 B1 | 4/2003 | Hac | |
| 6,560,524 B2 | 5/2003 | Lin et al. | |
| 6,625,529 B2 | 9/2003 | Obata et al. | |
| 6,834,543 B2 | 12/2004 | Kin et al. | |
| 6,929,086 B1 | 8/2005 | Husain et al. | |
| 7,085,641 B2 | 8/2006 | Post, II | |
| 7,136,730 B2 | 11/2006 | Lu et al. | |
| 7,316,288 B1 | 1/2008 | Bennett et al. | |
| 7,455,142 B2 | 11/2008 | Post, II | |
| 8,255,120 B2 | 8/2012 | Mikuriya et al. | |
| 8,494,718 B2 | 7/2013 | Muth et al. | |
| 2005/0096830 A1 | 5/2005 | Ohta et al. | |
| 2006/0048976 A1* | 3/2006 | Deguchi et al. ............ 180/6.5 |
| 2013/0110332 A1 | 5/2013 | Hwang | |

OTHER PUBLICATIONS

Louie, Wae Lenny; Non-final Office Action; Notification Date: Mar. 14, 2014; U.S. Appl. No. 13/765,783; Titled: Methods of Controlling Four-Wheel Steered Vehicles; Filed: Feb. 13, 2013; Inventors: Xiaodi Kang et al., in its entirety.

(Continued)

*Primary Examiner* — John Q Nguyen
*Assistant Examiner* — Anshul Sood
(74) *Attorney, Agent, or Firm* — Ulmer & Berne LLP

(57) ABSTRACT

A method for operating steerable rear wheels of a vehicle includes detecting a rear wheel steering angle of at least one of the steerable rear wheels, and detecting a first vehicular condition. The method further includes determining a weighted rear steering angle value based at least in part upon the rear wheel steering angle and the first vehicular condition, and controlling the steerable rear wheels in response to the weighted rear steering angle value.

14 Claims, 5 Drawing Sheets

(56) References Cited

OTHER PUBLICATIONS

U.S. Appl. No. 13/765,783; Titled: Methods of Controlling Four-Wheel Steered Vehicles; Filed: Feb. 13, 2013; Inventors Xiaodi Kang et al., in its entirety.

Andreasson, Johan et al., "On Road Vehicle Motion Control—striving toward synergy," Proceedings of AVEC '06, The 8th International Symposium on Advanced Vehicle Control, Aug. 20-24, 2006, Taipei, Taiwan, 7 pages in its entirety.

He, Junjie et al., "Coordination of active steering, driveline, and braking for integrated vehicle dynamics control," Proceedings of the Institution of Mechanical Engineers vol. 220, Part D: Journal Automobile Engineering, May 18, 2006, pp. 1401-1421.

Ono, E. et al., "Vehicle dynamics integrated control for four-wheel-distributed steering and four-wheel-distributed traction/braking systems," Vehicle System Dynamics, Feb. 2006, pp. 139-151, vol. 44, No. 2, Taylor & Francis Group.

Arabi, Samaneh et al., "Design of an Integrated Active Front Steering and Active Rear Differential Controller using Fuzzy Logic Control," Proceedings of the World Congress on Engineering, Jun. 30-Jul. 2, 2010, vol. II, London, U.K., 6 pages in its entirety.

Louie, Wae Lenny; Notice of Allowance and Fee(s) Due, issued in U.S. Appl. No. 13/765,783; dated as mailed on Sep. 17, 2014; Titled: Methods of Controlling Four-Wheel Steered Vehicles; Filed: Feb. 13, 2013; Inventor(s): Xiaodi Kang et al.; 22 pages.

* cited by examiner

FOUR-WHEEL STEERED VEHICLE AND TORQUE DISTRIBUTION CONTROL METHODS FOR SAME

TECHNICAL FIELD

A vehicle includes a four-wheel steer controller and an all-wheel drive controller. The four-wheel steer controller facilitates control of a steering angle of rear wheels. The all-wheel drive controller facilitates control of distribution of torque among the rear wheels.

BACKGROUND

A conventional four-wheel steered vehicle includes steerable front wheels and steerable rear wheels. The steerable rear wheels can be powered and the torques provided to the steerable rear wheels can be varied to facilitate traction, handling, and stability control. When the rear wheels are steered and powered simultaneously, they can be susceptible to losing traction and stability with a roadway causing instability and/or loss of control.

SUMMARY

In accordance with one embodiment, a method for controlling torque distribution to steerable rear wheels of a vehicle comprises detecting a rear wheel steering angle of at least one of the steerable rear wheels, and transmitting the rear wheel steering angle from a first controller to a second controller. The first controller is configured to facilitate steering of the steerable rear wheels, and the second controller is configured to facilitate distribution of torque among the steerable rear wheels. The method further comprises detecting a first vehicular condition and, at the second controller, performing the following: determining a weighted rear steering angle value based at least in part upon the rear wheel steering angle and the first vehicular condition, and controlling the steerable rear wheels in response to the weighted rear steering angle value.

In accordance with another embodiment, a method for controlling torque distribution to steerable rear wheels of a vehicle comprises detecting a rear wheel steering angle of at least one of the steerable rear wheels, and detecting a first vehicular condition. The method further comprises determining a weighted rear steering angle value based at least in part upon the rear wheel steering angle and the first vehicular condition, and determining a first control authority for a first controller based at least in part upon the weighted rear steering angle value. The first controller is configured to facilitate steering of the steerable rear wheels. The method still further comprises determining a second control authority for a second controller based at least in part upon the weighted rear steering angle value. The second controller is configured to facilitate distribution of torque among the steerable rear wheels. The method further comprises varying each of the first control authority and the second control authority in response to a change in the weighted rear steering angle value, and controlling the steering, and the distribution of torque of the steerable rear wheels in response to the first control authority and the second control authority.

In accordance with yet another embodiment, a method for controlling torque distribution to steerable rear wheels of a vehicle comprises determining a first control authority for a first controller and determining a second control authority for a second controller. The first controller is configured to facilitate steering of the steerable rear wheels, and the second controller is configured to facilitate distribution of torque among the steerable rear wheels. The method further comprises varying each of the first control authority and the second control authority simultaneously and inversely proportionately to one another, and controlling the steering and the distribution of torque of the steerable rear wheels in response to the first control authority and the second control authority.

BRIEF DESCRIPTION OF THE DRAWINGS

Various embodiments will become better understood with regard to the following description, appended claims and accompanying drawings wherein:

DETAILED DESCRIPTION

Figure 1:
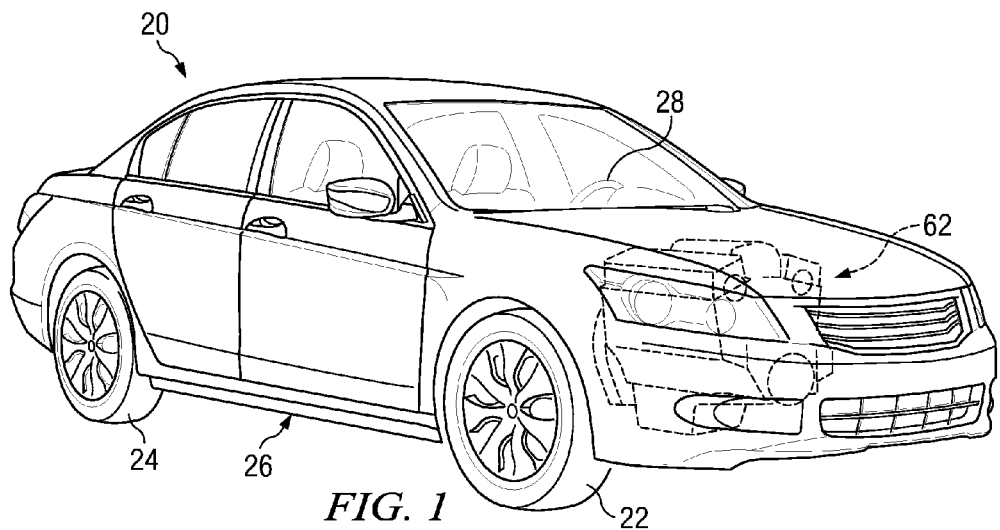
FIG. 1 is a right front perspective view depicting a vehicle, in accordance with one embodiment.

Embodiments are hereinafter described in detail in connection with the views of FIGS. 1-8, wherein like numbers indicate the same or corresponding elements throughout the views. A vehicle 20 in accordance with one embodiment can comprise an automobile, as illustrated in FIG. 1, or any of a variety of other suitable vehicles, such as a recreational vehicle or a utility vehicle, for example. As illustrated in FIG. 1, the vehicle 20 can comprise front wheels 22 and the rear wheels 24 that are rotatably supported with respect to a frame 26. The front wheels 22 and the rear wheels 24 of the vehicle 20 can comprise steerable wheels such that the vehicle 20 comprises a four-wheel steer (4WS) vehicle (e.g. an all-wheel steer (AWS) vehicle).

As illustrated in FIG. 1, the vehicle 20 can include a steering wheel 28 that can facilitate pivoting of the front and rear wheels 22, 24 to steer the vehicle 20. The front and rear wheels 22, 24 can be associated with respective front and rear steering assemblies that facilitate turning of the front and rear wheels 22, 24 in response to operation of the steering wheel 28. In one embodiment, the front steering assembly can comprise a rack and pinion arrangement that is mechanically coupled with the steering wheel 28. In such an embodiment, rotation of the steering wheel 28 clockwise or counterclockwise can mechanically actuate the rack and pinion arrangement to pivot the front wheels 22 rightwardly and leftwardly, respectively.

Figure 2:
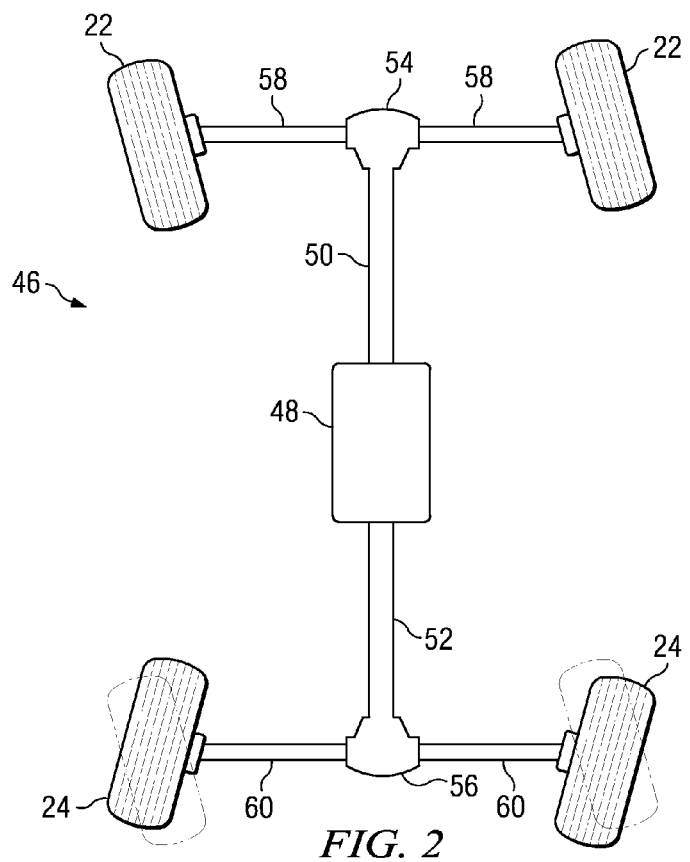
FIG. 2 is a schematic view depicting a drive train of the vehicle of FIG. 1, wherein rear wheels are shown turned out-of-phase in solid lines and in-phase in dashed lines.

As illustrated in FIG. 2, when the front wheels 22 are turned, the rear wheels 24 can be turned either in-phase with the front wheels 22 (e.g., turned in the same direction as the front wheels 22 as illustrated in dashed lines) or out-of-phase with the front wheels 22 (e.g., turned in an opposite direction as the front wheels 22 as illustrated in solid lines). With the rear wheels 24 turned out-of-phase with the front wheels 22, the vehicle 20 can turn at a smaller turning radius than would otherwise be possible by turning only the front wheels 22. With the rear wheels 24 turned in-phase with the front wheels 22, the vehicle 20 can be less susceptible to instability and/or loss of traction, and can undergo less yaw than would otherwise be encountered by turning only the front wheels 22.

In one embodiment, turning the rear wheels 24 in-phase or out-of-phase with the front wheels 22 can depend upon the speed of the vehicle 20. For example, when the vehicle 20 is operating at a low speed (e.g., below about 30 KPH), the rear wheels 24 can turn out-of-phase with the front wheels 22. When the vehicle 20 is operating at a high speed, such as above about 30 KPH, the rear wheels 24 can turn in-phase with the front wheels 22.

In another embodiment, turning of the rear wheels 24 can be selectively disabled depending upon the speed of the vehicle 20. For example, when the vehicle 20 is operating at a relatively high speed, such as above about 30 KPH, steering of the rear wheels 24 can be disabled such that the vehicle 20 operates as a two-wheel steered vehicle.

The overall magnitude of the steering angle of the rear wheels 24 (e.g., the rear steering angle) can depend upon whether the rear wheels 24 are turned in-phase or out-of-phase with the front wheels 22. For example, when the rear wheels 24 are turned out-of-phase with the front wheels 22, the front and rear wheels 22, 24 can turn simultaneously such that the magnitude of the rear steering angle is substantially similar to the magnitude of the overall steering angle of the front wheels 22 (e.g., the front steering angle). When the rear wheels 24 are turned in-phase with the front wheels 22, the rear wheels 24 may not turn as far as the front wheels 22 such that the magnitude of the rear steering angle is substantially less than the magnitude of the front steering angle.

Figure 3:
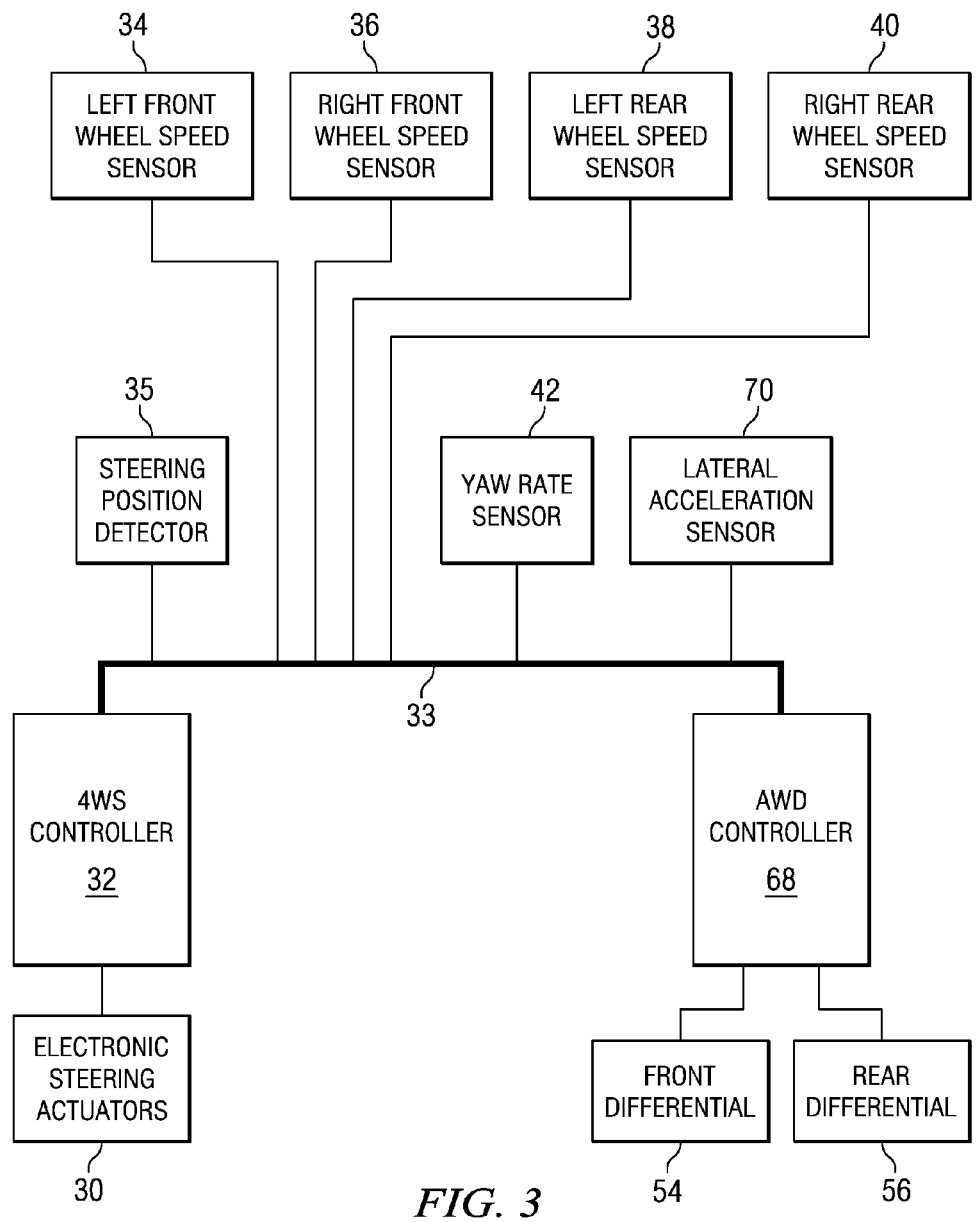
FIG. 3 is block diagram of a four-wheel steer (4WS) controller and an all-wheel drive (AWD) controller together with certain other components of the vehicle of FIG. 1.

As illustrated in FIG. 3, the vehicle 20 can include a 4WS controller 32 that facilitates operation of electronic steering actuators 30 to steer the rear wheels 24. The electronic steering actuators 30 can each be respectively associated with one of the rear wheels 24 and can facilitate motorized individual pivoting of the rear wheels 24. When the steering wheel 28 is turned to steer the vehicle 20, the 4WS controller 32 can operate the electronic steering actuators 30 to control the steering of the rear wheels 24 in a manner that enhances vehicle maneuverability (e.g., via out-of-phase rear wheel steering at low speeds), enhances vehicle cornering stability (e.g., via in-phase rear wheel steering at high speeds), contributes to sideslip control, and/or enhances the transient steering response characteristics of the vehicle (e.g., through enhanced yaw resonant frequency and damping properties). The particular steering angle of the rear wheels 24 can depend upon the position of the steering wheel 28 as well as a variety of vehicular conditions, such as a throttle position, a vehicle speed, a yaw rate, or other conditions that might be effective for selecting an appropriate rear steering angle. In one embodiment, each of the electronic steering actuators 30 can be operated independently and the steering angle of each of the rear wheels 24 can be individually selected to provide an effective Ackerman angle for the rear wheels 24. Alternatively, the rear wheels 24 can be pivoted together by one or more actuators.

The 4WS controller 32 can be electrically coupled with the electronic steering actuators 30 in a drive-by-wire configuration or in any of a variety of suitable alternative configurations. It will be appreciated that the 4WS controller 32 can comprise an engine control unit (ECU), a power train control module (PCM), an engine control module (ECM) or any of a variety of other suitable alternative vehicular controllers.

In one embodiment, the electronic steering actuators 30 can comprise linear-type servo motors. Each of the linear-type servo motors can include a movable plunger that is coupled with a steering knuckle of one of the respective rear wheels 24. The movable plungers can be selectively and individually operated to pivot the respective steering knuckles about a kingpin axis and facilitate turning of the rear wheels 24. It will be appreciated that the electronic steering actuators 30 can comprise any of a variety of suitable alternative arrangements that facilitate electronic control of rear wheel steering. It will also be appreciated that front and rear wheel steering assemblies can be configured in any of a variety of suitable alternative arrangements that facilitate mechanical or electrical steering of a vehicle's wheels.

As illustrated in FIG. 3, the 4WS controller 32 can be coupled with a Control Area Network (CAN) bus 33 that facilitates communication between various control systems and control components. The 4WS controller 32 can collect vehicular data from a variety of suitable data sources either indirectly (i.e., via the CAN bus 33) or directly from the data sources to facilitate selection of an appropriate rear steering angle. For example, a steering position detector 35 can be coupled with the CAN bus 33 to provide steering position data to the 4WS controller 32 via the CAN bus 33. In one embodiment, the steering position detector 35 can comprise a potentiometer that is coupled with the steering wheel 28 (e.g., attached to a steering column). When the steering wheel 28 is moved, a resistance of the potentiometer changes to indicate the position of the steering wheel 28. In another embodiment, the steering position detector 35 can comprise an encoder. In other embodiments, the steering position detector 35 can be any of a variety of suitable alternative electrical or electromechanical devices that facilitate detection of a position of the steering wheel 28.

Referring again to FIG. 3, a left front wheel speed sensor 34, a right front wheel speed sensor 36, a left rear wheel speed sensor 38, and a right rear wheel speed sensor 40 can be coupled with the CAN bus 33. The 4WS controller 32 can collect wheel speed data from each of the wheel speed sensors 34, 36, 38, 40 and can process the speed data to determine the overall speed of the vehicle 20. In one embodiment, each of the wheel speed sensors 34, 36, 38, 40 can comprise a Hall Effect type sensor located adjacent to the respective front and rear wheels 22, 24 and configured to gather speed data directly or indirectly from the wheels. In other embodiments, the wheel speed sensors 34, 36, 38, 40 can be any of a variety of suitable speed sensor arrangements such as, for example, sensors associated with front or rear axle shafts (e.g., in FIG. 2), a transmission, a transfer assembly, and/or an engine, which can indirectly obtain speed data. It will be appreciated that the 4WS controller 32 can additionally or alternatively determine a vehicular speed from a speedometer, a GPS output, other data from the CAN bus 33, or any of a variety of other suitable vehicular speed detection arrangements.

Referring again to FIG. 3, a yaw rate sensor 42 can be coupled with the CAN bus 33 such that the 4WS controller 32 can provide yaw rate data to the 4WS controller 32 via the CAN bus 33. In one embodiment, the yaw rate sensor 42 can comprise a gyroscopic sensor (e.g., piezoelectric or micromechanical) that measures angular velocity around a vertical axis, but in other embodiments, can comprise any of a variety of other suitable arrangements that facilitate detection of a vehicle's yaw rate.

It will be appreciated that the steering angle of the rear wheels can be controlled according to any of a variety of suitable individual vehicular conditions or combinations thereof. In one embodiment, the 4WS controller 32 can be configured to vary a transient response of the rear steering system according to a yaw resonant frequency and a dampening characteristic of a suspension system.

As illustrated in FIG. 2, the vehicle 20 can include a drivetrain 46 that includes a transmission 48 operably coupled with front and rear drive shafts 50, 52. Each of the front and rear drive shafts 50, 52 can be coupled with respective front and rear differentials 54, 56. The front and rear differentials 54, 56 and the front and rear wheels 22, 24 can be coupled together by respective pairs of front and rear axle shafts 58, 60. An engine (62 shown in FIG. 1) can be coupled with the transmission 48 and can provide motive power to the transmission 48 to facilitate driving of at least one of the front wheels 22 and/or at least one of the rear wheels 24. The transmission 48 can be operable in one of a plurality of gears to facilitate operation of the vehicle 20 at different speeds.

The front and rear differentials 54, 56 can be configured to selectively distribute torque among the front and rear wheels 22, 24 to enhance traction, handling performance, and/or stability. For example, when any of the front wheels 22 or rear wheels 24 undergoes slip, the torque to the slipping wheel(s) can be reduced and redistributed to the non-slipping wheel(s). In one embodiment, the front and rear differentials 54, 56 can comprise limited slip-type differentials. In such an embodiment, each of the front and rear differentials 54, 56 can comprise electromagnetic clutches that can be coupled with each of the front and rear axle shafts 58, 60. The electromagnetic clutches can be selectively and independently actuated to vary the torque distribution among the front and rear wheels 22, 24. It will be appreciated that any of a variety of other suitable alternative variable-type differentials can be provided.

As illustrated in FIG. 3, the vehicle 20 can comprise an all-wheel drive (AWD) controller 68 that is coupled with each of the front and rear differentials 54, 56 and is configured to control operation of the front and rear differentials 54, 56 to facilitate distribution of torque among the front and rear wheels 22, 24. For example, if the vehicle 20 begins to lose traction with a roadway and/or begins to undergo a lateral slide, the AWD controller 68 can vary the distribution of torque among the front wheels 22 and/or the rear wheels 24 to reduce traction loss and/or reduce lateral instability. The AWD controller 68 can comprise an engine control unit (ECU), a power train control module (PCM), an engine control module (ECM) or any of a variety of other suitable alternative vehicular controllers. The AWD controller 68 can distribute torque among the front and rear wheels 22, 24 in response to any of a variety of vehicular conditions, such as a steering angle input (e.g., from the steering position detector 35), a throttle position input, a vehicle speed, and/or a vehicular acceleration.

As illustrated in FIG. 3, the AWD controller 68 can be coupled with the CAN bus 33. During operation of the vehicle 20, the 4WS controller 32 and the AWD controller 68 can communicate with each other via the CAN bus 33 to coordinate their control of the rear wheels 24. For example, when the vehicle 20 turns, the 4WS controller 32 and the AWD controller 68 can provide an appropriate amount of rear steer angle and torque to operate the vehicle 20 effectively through the turn. Coordinating the operation of the 4WS controller 32 and the AWD controller 68 in this manner can provide enhanced overall stability and performance of the vehicle 20.

During operation of the vehicle 20, one of the 4WS controller 32 and the AWD controller 68 can have more authority (e.g., control authority) over the other to effectively control operation of the rear wheels 24. The authority of one controller over the other can be determined depending upon which controller is more effective to enhance operation of the vehicle 20 (e.g., in view of the rear wheel lateral and longitudinal force interaction). For example, when the rear tire forces, lateral response characteristics and performance of the vehicle 20 is better controlled through torque distribution (e.g., when turning the vehicle 20 at high speeds or during other non-linear or near limit operations), the AWD controller 68 can be given control authority over the 4WS controller 32 to operate the rear wheels 24. Conversely, when the rear tire forces, lateral response characteristics and performance of the vehicle 20 is more effectively controlled through rear wheel steering (e.g., when turning the vehicle 20 in linear range of tire operations, less throttle, or off-power throttle situations), the 4WS controller 32 can be given control authority over the AWD controller 68 to operate the rear wheels 24.

The control authorities of the 4WS controller 32 and the AWD controller 68 can be varied simultaneous and inversely proportional to one another. For example, if the control authority of the AWD controller 68 increases, the control authority of the 4WS controller 32 can decrease to allow the AWD controller 68 more control over the rear wheels 24. Varying the respective control authorities of the 4WS controller 32 and the AWD controller 68 in this manner can ensure that the 4WS controller 32 and the AWD controller 68 operate harmoniously and avoid competing for control of the rear wheels 24, as in some conventional arrangements.

For example, a 4WS system of a conventional vehicle controls steering of rear wheels and is implemented in conjunction with an AWD system. Each of the systems are designed and controlled independently of one another and without consideration for parallel operation of the 4WS system and the AWD system. When only one of the systems is active (either to distribute torque to rear wheels or to facilitate steering of the rear wheels), the other system might remain dormant. However, when the 4WS system and the AWD system are activated simultaneously, each system can try to exert full control over the rear wheels (i.e., non-coordinated control authorities). When the vehicle turns, the AWD system might not account for the turning of the rear wheels and might apply an amount of torque to the rear wheels that is inappropriate for the particular angle of the rear wheels (e.g., due to the longitudinal and lateral force interaction of the tires, the total force saturation of the tires, and/or a decrease in available cornering force). Such an amount of torque might cause the rear wheels to lose traction with the roadway thereby adversely affecting the overall response, stability and performance of the vehicle. This can be particularly problematic when the 4WS system and the AWD system are both feed-forward control systems. Conversely, in the present embodiment, the 4WS controller 32 and the AWD controller 68 can coordinate their control authorities to enhance the overall stability and operation performance of the vehicle 20 and reduce the opportunity for conflict.

In one embodiment, the control authorities of the 4WS controller 32 and the AWD controller 68 can depend at least in part upon a weighted rear steering angle value $\delta rt$. The weighted rear steering angle value $\delta rt$ can be based upon the following expression:

$$\delta rt = \delta ro \times Kvo) + ((\delta ri \times Kvi)$$

where $\delta ro$ and $\delta ri$ are outer and inner rear steering angles, respectively, and $Kvo$ and $Kvi$ are outer and inner speed-based scaling factors, respectively. The weighted rear steering angle value $\delta rt$ can be calculated by first identifying each of the of the rear wheels 24 as either an inner wheel or an outer wheel (depending upon the direction of a turn). For example, for a left-handed turn, the left wheels can be the inner wheels and for a right-handed turn the right wheels can be the inner wheels. The direction of the turn can be determined from a lateral acceleration sensor 70 (FIG. 3), from the steering position detector 35, from the CAN bus 33, or from any of a variety of suitable alternative data sources. In one embodiment, the lateral acceleration sensor 70 can comprise an accelerometer, but in other embodiments, the lateral acceleration sensor 70 can comprise any of a variety of other suitable arrangements that facilitate detection of a vehicle's lateral acceleration. Once the outer and inner rear wheels have been identified, the AWD controller 68 can determine the outer and inner speed-based scaling factors Kvo and Kvi.

Figure 4:
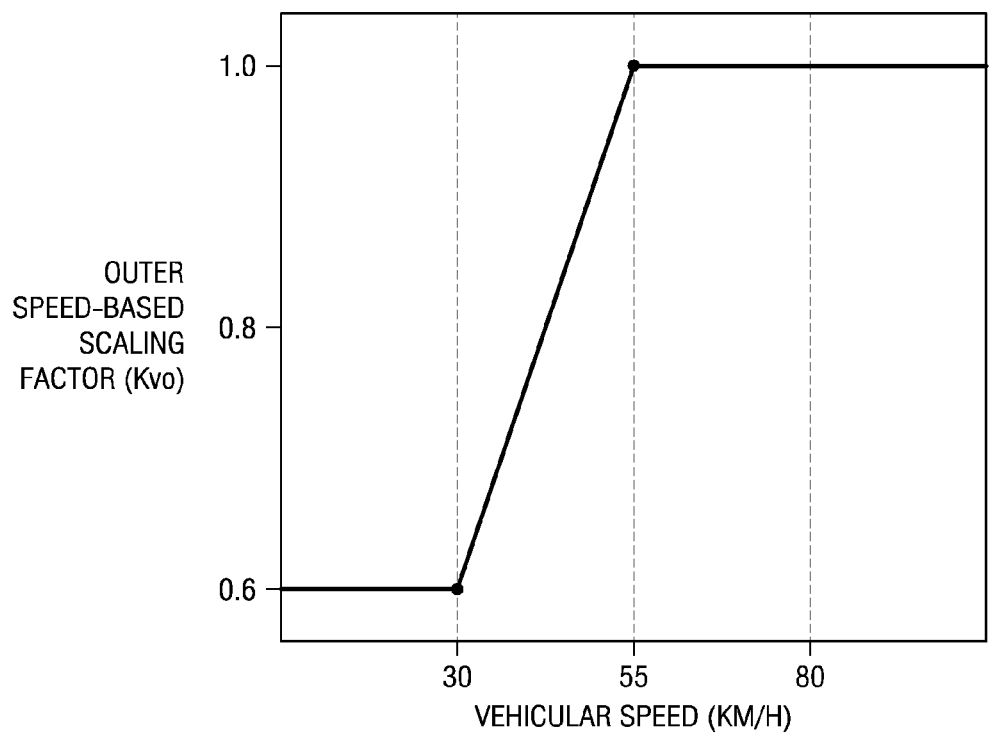
FIG. 4 is an example plot depicting a relationship between an outer speed-based scaling factor and vehicular speed.
Figure 5:
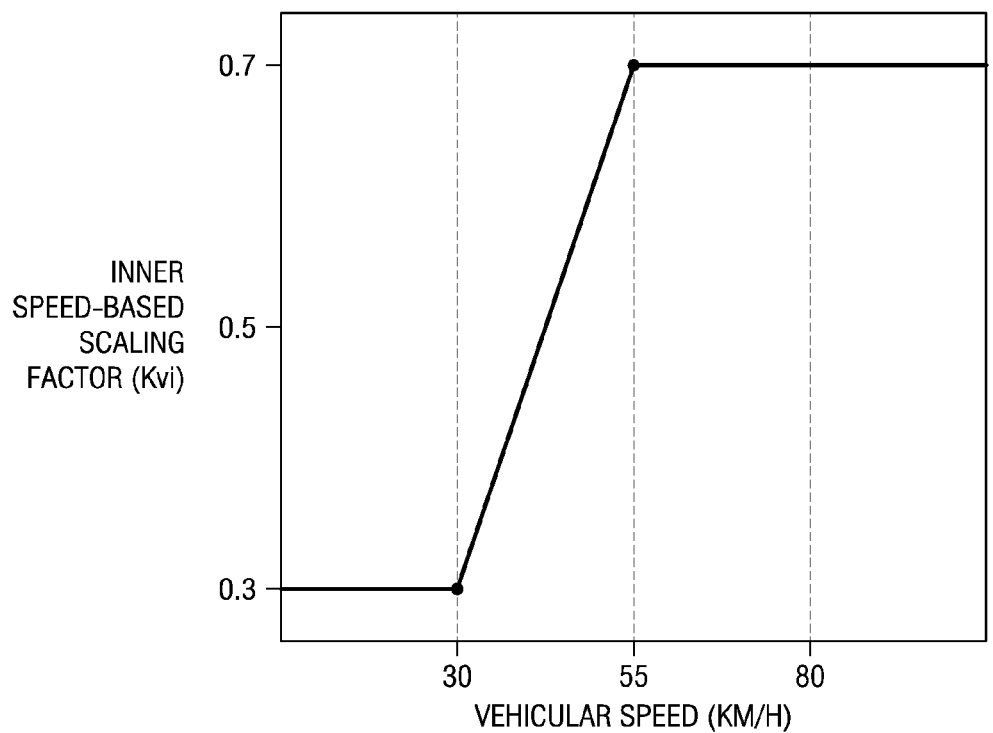
FIG. 5 is an example plot depicting a relationship between an inner speed-based scaling factor and vehicular speed.

The outer speed-based scaling factor Kvo can be greater than the inner speed-based scaling factor Kvi which can accordingly allow the outer rear steering angle to have greater influence on the weighted rear steering angle value δrt. The outer and inner speed-based scaling factors Kvo, Kvi can depend at least in part upon the speed of the vehicle. When the speed of the vehicle increases, each of the speed-based scaling factors Kvo, Kvi can increase. In one embodiment, the outer speed-based scaling factor Kvo can be maintained at a first value when the vehicular speed is below a first threshold speed value and at a second value when the vehicular speed is above a second threshold speed value. The inner speed-based scaling factor Kvi can be maintained at a third value when the vehicular speed is below the first threshold speed value and at a fourth value when the vehicular speed is above the second threshold speed value. The first value can be greater than the third value and the second value can be greater than the fourth value. In another embodiment, the speed-based scaling factors Kvo, Kvi can be determined according to respective outer and inner speed-based scaling factor maps. Graphical representations of the outer and inner speed-based scaling maps, in accordance with one embodiment, are depicted in FIGS. 4 and 5, respectively. In these examples, when the speed of the vehicle 20 is between about 0-30 kilometers per hour (KM/H), the outer speed-based scaling factor Kvo can be maintained at about 0.6 and the inner speed-based scaling factor Kvi can be maintained at about 0.3. When the speed increases from about 30 to about 55 K.P.H., the outer speed-based scaling factor Kvo can increase from about 0.6 to about 1.0, and the inner speed-based scaling factor Kvi can increase from about 0.3 to about 0.7. When the speed is above about 55 K.P.H., the outer speed-based scaling factor Kvo can be maintained at about 1.0 and the inner speed-based scaling factor Kvi can be maintained at about 0.7. In calculating the weighted rear steering angle value δrt, the outer rear steering angle δro can accordingly be weighted from between about 60% to about 100%, and the inner rear steering angle δri can accordingly be weighted from between about 30% to about 70%, depending upon the speed of the vehicle 20. It will be appreciated that any of a variety of suitable alternative speed-based scaling factor maps can be provided.

Figure 6:
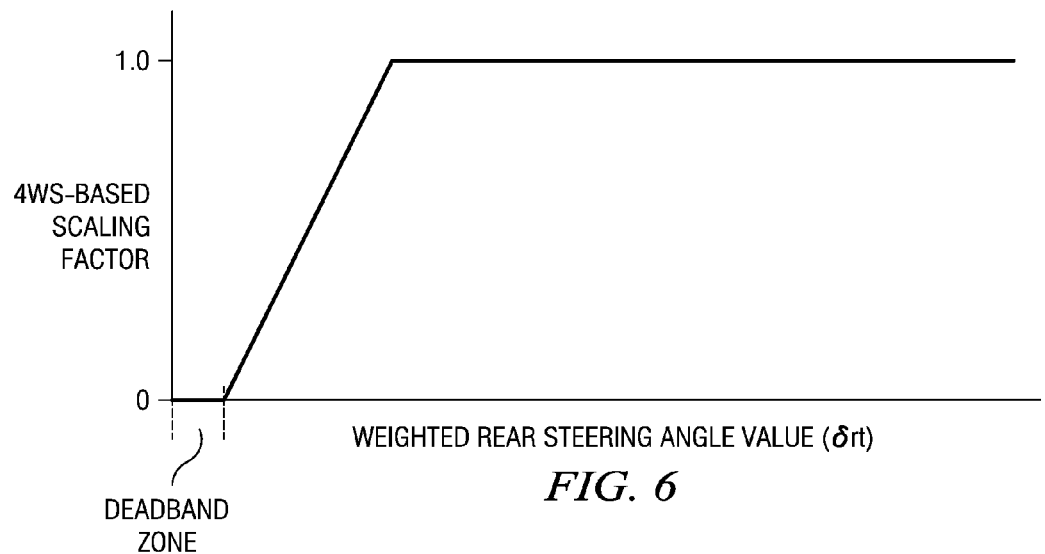
FIG. 6 is an example plot depicting a relationship between a 4WS-based scaling factor and a weighted rear steering angle value.

A 4WS-based scaling factor can be determined from the weighted rear steering angle value δrt and can range from between about 0 to about 1. The 4WS-based scaling factor can affect the control authorities of the 4WS controller 32 and the AWD controller 68. For example, when the 4WS-based scaling factor is at about 0, the 4WS controller 32 can have minimum control authority and the AWD controller 68 can have maximum control authority. When the 4WS-based scaling factor is about 1, the 4WS controller 32 can have maximum control authority and the AWD controller 68 can have minimum control authority. In one embodiment, the 4WS-based scaling factor can be determined according to a weighted rear steering angle map. The 4WS-based scaling factor can increase as the weighted rear steering angle value δrt increases. A graphical representation of a weighted rear steering angle map, in accordance with one embodiment, is depicted in FIG. 6. In such an example, when the weighted rear steering angle value δrt is small and within a dead band zone, the 4WS-based scaling factor can be at about 0. Once the weighted rear steering angle value δrt increases past the dead band zone, the 4WS-based scaling factor can increase linearly until it reaches a value of about 1. It will be appreciated that in some embodiments, when the 4WS-based scaling factor is about 1, the 4WS controller 32 can have all control authority while in other embodiments, the AWD controller 68 can still have some control authority.

The vehicular speed and steering angle of the rear wheels 24 can accordingly influence how the control authority is distributed between the 4WS controller 32 and the AWD controller 68. When the rear steering angle and/or speed of the vehicle 20 are relatively low, the lateral stability and performance of the vehicle 20 can be better controlled through torque distribution due to relatively high tire grip and drive torque availability. The 4WS-based scaling factor can accordingly be set to a low value (e.g., about 0) to provide more control authority to the AWD controller 68. As the rear steering angle and/or speed of the vehicle 20 increases, controlling the torque distribution may not be as effective in providing lateral stability and performance as steering the rear wheels 24. Therefore, the 4WS-based factor can increase to reduce the control authority of the AWD controller 68 and increase the control authority of the 4WS controller 32. It will be appreciated that the dead band zone depicted in FIG. 6 can be selected to prevent negligible steering angles and speeds from affecting the control authorities of the 4WS controller 32 and the AWD controller 68.

Figure 7:
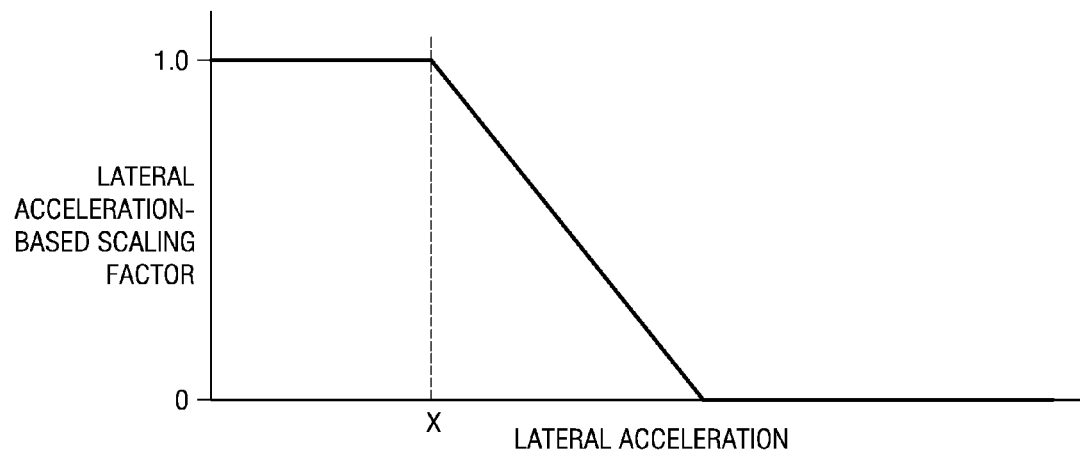
FIG. 7 is an example plot depicting a relationship between a lateral acceleration-based scaling factor and a lateral acceleration.

Once the 4WS-based scaling factor has been determined, a lateral acceleration-based scaling factor can be determined from the vehicle's current lateral acceleration. The lateral acceleration-based scaling factor can range from between about 0 and 1 and can affect the control authority of the 4WS controller 32 from the 4WS-based scaling factor that was previously determined (e.g., from the 4WS-based scaling factor). In one embodiment, the lateral acceleration-based scaling factor can be determined according to a lateral acceleration-based scaling factor map. A graphical representation of a lateral acceleration-based scaling factor map, in accordance with one embodiment, is depicted in FIG. 7. In such an example, when the lateral acceleration of the vehicle 20 is relatively small (e.g., tires are operating in linear range), the lateral acceleration-based scaling factor can be about 1. The lateral acceleration-based scaling factor can remain at about 1 until the lateral acceleration of the vehicle 20 reaches a critical value X. The critical value X can be any particular lateral acceleration of the vehicle 20 where the AWD controller 68 becomes better suited than the 4WS controller 32 to provide effective stability and performance of the vehicle 20. Once the lateral acceleration reaches the critical value X, the lateral acceleration-based scaling factor can decrease linearly or nonlinearly until it is reduced to about zero. Decreasing the lateral acceleration-based scaling factor in this manner can decrease the 4WS-based scaling factor which can reduce the control authority of the 4WS controller 32 and accordingly provide more control authority to the AWD controller 68.

The lateral acceleration-based scaling factor can be applied to the 4WS-based scaling factor such that the control authority of the 4WS controller 32 can also be influenced by the lateral acceleration of the vehicle 20. For lateral acceleration values where four wheel steering is appropriate to control lateral stability and performance, the control authority of the 4WS controller 32 can be maintained as originally calculated (e.g., the lateral acceleration-based scaling factor can be about 1). However, once the lateral acceleration increases beyond the point where four wheel steering is most effective (e.g., the critical value X), the control authority of the 4WS controller 32 can be gradually reduced as the lateral acceleration increases (e.g., the lateral acceleration based scaling factor can increase) thereby allowing more control authority for the AWD controller 68.

It will be appreciated that by determining the control authorities of the 4WS controller 32 and the AWD controller 68 by combining a 4WS-based scaling factor and a lateral acceleration-based scaling factor together can provide appropriate control of the rear wheels 24 in response to the rear steering angle, the vehicular speed, and lateral acceleration, and more effectively than conventional arrangements. It will also be appreciated that the determination of a control authority can rely upon a variety of additional or alternative vehicular operational conditions, such as, for example, a rear tire grip margin indicator, a rear tire saturation level (e.g., based on vehicle total acceleration), and a surface friction coefficient.

In one embodiment, the AWD controller 68 can control the control authorities of the 4WS controller 32 and the AWD controller 68 according to an enhanced torque bias ratio value. The enhanced torque bias ratio value can first be determined by calculating a standard torque bias ratio value. The standard torque bias ratio value can be a control variable for the distribution of torque among the rear wheels according to the two-wheel steering properties of the vehicle 20 (e.g., irrespective of any rear wheel steering). In some conventional two-wheel steered vehicles, the standard torque bias ratio value is the control variable responsible for controlling the distribution of torque among rear (non-steered) wheels. However, in the present embodiment, once the standard torque bias ratio value is determined, the enhanced torque bias ratio value can be determined by applying the 4WS-based scaling factor and the lateral acceleration-based scaling factor to the standard torque bias ratio value. The AWD controller 68 can then control the distribution of torque among the rear wheels according to the enhanced torque bias ratio value which can vary the control authorities of the 4WS controller 32 and the AWD controller 68 appropriately to facilitate effective stability and overall vehicular performance. For example, as the 4WS-based scaling factor and the lateral acceleration based scaling factors increase, the AWD controller 68 can adjust its control of the rear wheels 24 based upon the enhanced torque bias ratio value to decrease its own control authority and increase the control authority of the 4WS controller 32.

In such an embodiment, the 4WS controller 32 can transmit rear steering angle data to the AWD controller 68 (e.g., via the CAN bus 33). The AWD controller 68 can obtain wheel speed data (e.g., from the wheel speed sensors 34, 36, 38, 40) and can calculate the weighted rear steering angle value δrt and the 4WS-based scaling factor. The AWD controller 68 can also obtain lateral acceleration data and can calculate the lateral acceleration-based scaling factor. The AWD controller 68 can then calculate the standard torque bias ratio value, can calculate the enhanced torque bias ratio value from the standard torque bias ratio value, the 4WS-based scaling factor, and the lateral acceleration-based scaling factor, and can control the rear wheels 24 accordingly. In some embodiments, the AWD controller 68 can provide the 4WS-based scaling factor and the lateral acceleration-based scaling factor through a low pass filter prior to calculating the enhanced torque bias ratio to filter out sudden condition changes. It will be appreciated that the 4WS controller 32 can be configured to additionally or alternatively contribute to calculation of the enhanced torque bias ratio value.

Figure 8:
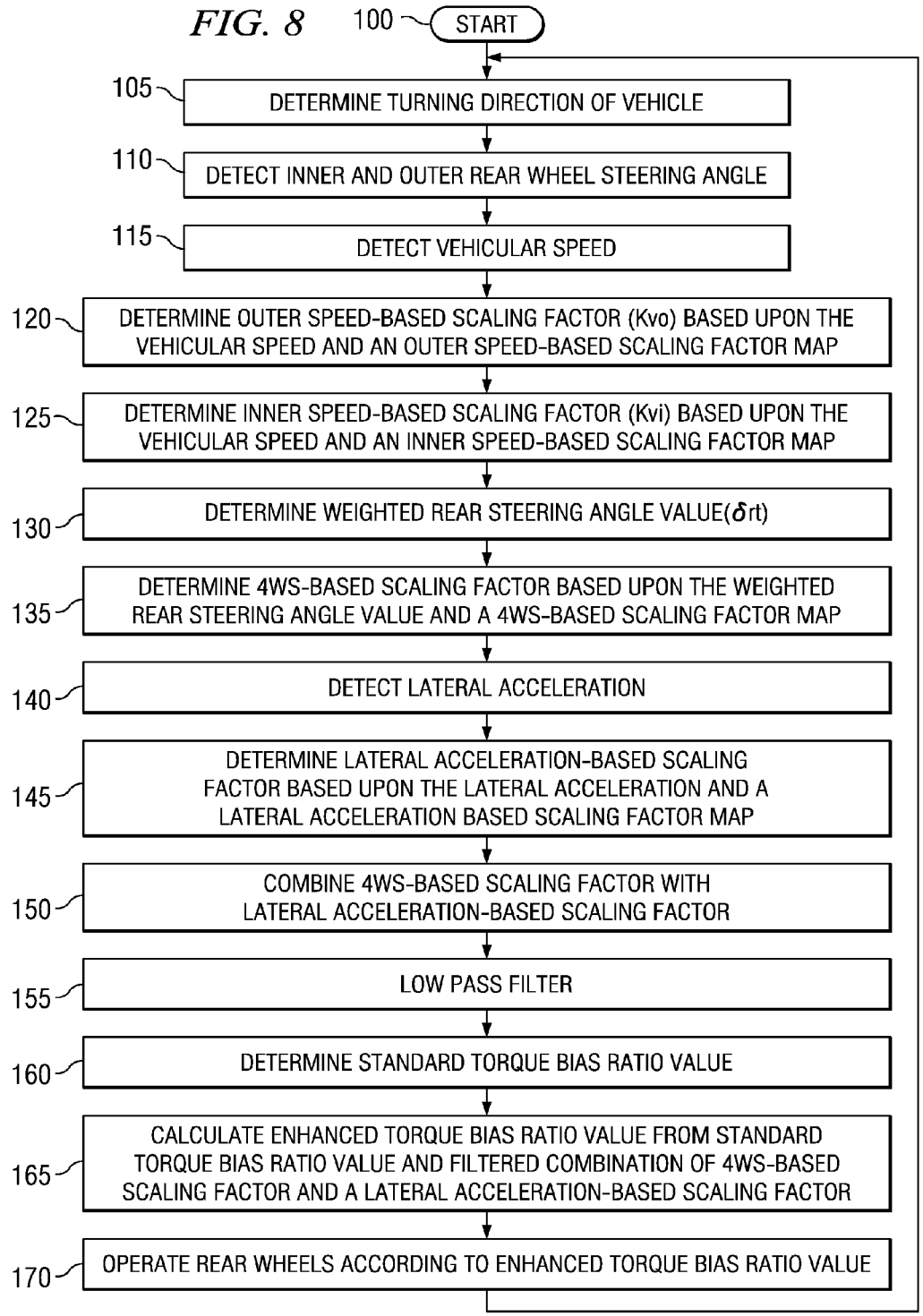
FIG. 8 is a flow chart depicting a control routine implemented by the 4WS controller and the AWD controller of FIG. 3, according to one embodiment

One embodiment of a control routine implemented by the AWD controller 68 is generally illustrated in FIG. 8. Upon startup (100), the AWD controller 68 can determine the turning direction of the vehicle (105), detect the inner and outer rear wheel steering angle (e.g., the detected rear wheel steering angle) (110), and detect the vehicular speed (115). The AWD controller 68 can then determine an outer speed-based scaling factor Kvo based upon the vehicular speed and an outer speed-based scaling factor map (120) and can determine an inner speed-based scaling factor Kvi based upon the vehicular speed and an inner speed-based scaling factor map (125). The weighted rear steering angle value δrt can be determined based upon the detected inner and outer rear steering angles, the outer speed-based scaling factor Kvo, and the inner speed-based scaling factor Kvi (130). The 4WS-based scaling factor can be determined based upon the weighted rear steering angle value δrt and a 4WS-based scaling factor map (135). The lateral acceleration can be detected (140) and the lateral acceleration based scaling factor can be determined based upon the detected lateral acceleration and a lateral acceleration-based scaling factor map (145). The 4WS-based scaling factor and the lateral acceleration-based scaling factor can be combined (150) and low-pass filtered (155). A standard torque bias ratio can be determined (160) and an enhanced torque bias ratio value can be calculated (165) from the standard torque bias ratio and the filtered combination of the 4WS-based scaling factor and the lateral acceleration-based scaling factor. The AWD controller 68 can then operate the rear wheels 24 according to the enhanced torque bias ratio value (170). It will be appreciated that the AWD controller 68 and/or the 4WS controller 32 can perform certain steps of the control routine in any sequence, such as alternatively or parallel with one another, for example.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A method for controlling torque distribution to steerable rear wheels of a vehicle, the method comprising:
generating rear wheel steering data, by a first controller, to facilitate steering of at least one of the steerable rear wheels;
generating a theoretical standard torque bias ratio value, by a second controller, for controlling the distribution of torque to the steerable rear wheels without rear steering;

transmitting the rear wheel steering data from the first controller to the second controller along a bidirectional communication bus;
determining, by the second controller, a vehicular speed;
determining, by the second controller, a lateral acceleration;
calculating, by the second controller, a scaling factor based at least in part upon one or more of the vehicular speed and the lateral acceleration;
calculating, by the second controller, a enhanced torque bias ratio value based at least in part upon the theoretical standard torque bias ratio value and the scaling factor;
transmitting the enhanced torque bias ratio value from the second controller to the first controller along the bidirectional communication bus;
allocating a first control authority to the first controller in response to the enhanced torque bias ratio value;
allocating a second control authority to the second controller in response to the enhanced torque bias ratio value;
controlling steering of the steerable rear wheels, by the first controller, in response to the first control authority; and
controlling distribution of torque among the steerable rear wheels, by the second controller, in response to the second control authority;
wherein the first control authority and the second control authority are inversely proportional to one another.

2. The method of claim 1 wherein calculating the scaling factor comprises calculating a four-wheel steering based scaling factor by:
determining, by the second controller, a turning direction of the vehicle;
determining, by the second controller, inner and outer wheels based at least in part upon the turning direction;
determining, by the second controller, an inner wheel scaling factor based at least in part upon the vehicular speed;
determining, by the second controller, an outer wheel scaling factor based at least in part upon the vehicular speed;
detecting an inner steering angle value of the inner wheel;
applying the inner wheel scaling factor to the inner steering angle value;
detecting an outer steering angle of the outer wheel; and
applying the outer wheel scaling factor to the outer steering angle value;
wherein the inner wheel scaling factor is less than the outer wheel scaling factor.

3. The method of claim 2 further comprising increasing the first control authority and decreasing the second control authority when at least one of the vehicular speed, the steering angle value of the inner wheel, and the steering angle value of the outer wheel increases.

4. The method of claim 2 wherein:
the inner wheel scaling factor:
remains at a first value for a first range of vehicular speeds;
increases from the first value to a second value for a second range of vehicular speeds; and
remains at a third value for a third range of vehicular speeds;
the outer wheel scaling factor:
remains at a fourth value for the first range of vehicular speeds;
increases from the first value to the second value for a fifth range of vehicular speeds; and
remains at the third value for a sixth range of vehicular speeds;

the fourth value is greater than the first value;
the fifth value is greater than the second value; and
the sixth value is greater than the third value.

5. The method of claim 1 wherein calculating the scaling factor comprises calculating a four-wheel steering based scaling factor based at least in part upon the vehicular speed and the turning direction.

6. The method of claim 1 wherein calculating the scaling factor comprises calculating a lateral acceleration-based scaling factor based at least in part upon the lateral acceleration.

7. The method of claim 6 further comprising decreasing the first control authority and increasing the second control authority when the lateral acceleration increases.

8. A method for controlling torque distribution to steerable rear wheels of a vehicle, the method comprising:
detecting a rear wheel steering angle of at least one of the steerable rear wheels;
calculating a four wheel steering based scaling factor based at least in part upon the rear wheel steering angle;
generating a theoretical standard torque bias ratio value, by a second controller, for controlling the distribution of torque to the steerable rear wheels without rear steering;
calculating a enhanced torque bias ratio value based at least in part upon the standard torque bias ratio value and the four wheel steering based scaling factor;
determining a first control authority for a first controller based upon the enhanced torque bias ratio value, the first controller being configured to facilitate steering of the steerable rear wheels;
determining a second control authority for a second controller based at least in part upon the enhanced torque bias ratio value, the second controller being configured to facilitate distribution of torque among the steerable rear wheels;
varying each of the first control authority and the second control authority in response to a change in the enhanced torque bias ratio value; and
controlling the steering and the distribution of torque of the steerable rear wheels in response to the first control authority and the second control authority.

9. The method of claim 8 further comprising:
determining by the second controller, a vehicular speed; and
calculating the four wheel steering based scaling factor based at least in part upon the vehicular speed.

10. The method of claim 9 wherein calculating the four-wheel steering based scaling factor further comprises:
determining a turning direction for the vehicle;
identifying inner and outer wheels based at least in part upon the turning direction;
determining an inner wheel scaling factor based at least in part upon the vehicular speed;
determining an outer wheel scaling factor based at least in part upon the vehicular speed;
detecting an inner steering angle value of the inner wheel;
applying the inner wheel scaling factor to the inner steering angle value;
detecting an outer steering angle of the outer wheel; and
applying the outer wheel scaling factor to the outer steering angle value;
wherein the inner wheel scaling factor is less than the outer wheel scaling factor.

11. The method of claim 10 further comprising increasing the first control authority and decreasing the second control authority when at least one of the vehicular speed, the steering angle value of the inner wheel, and the steering angle value of the outer wheel increases.

12. The method of claim 11 further comprising:
determining by the second controller, a lateral acceleration; and
decreasing the first control authority and increasing the second control authority when the lateral acceleration increases.

13. The method of claim 9 wherein:
the inner wheel scaling factor:
  remains at a first value for a first range of vehicular speeds;
  increases from the first value to a second value for a second range of vehicular speeds; and
  remains at a third value for a third range of inner steering angle values;
the outer wheel scaling factor:
  remains at a fourth value for the first range of vehicular speeds;
  increases from the first value to the second value for a fifth range of vehicular speeds; and
  remains at the third value for a sixth range of inner steering angle values;
the fourth value is greater than the first value;
the fifth value is greater than the second value; and
the sixth value is greater than the third value.

14. A method for controlling torque distribution to steerable rear wheels of a vehicle, the method comprising:
determining a lateral acceleration;
calculating a lateral acceleration based scaling factor based at least in part upon the lateral acceleration;
generating a theoretical standard torque bias ratio value for controlling the distribution of torque to the steerable rear wheels without rear steering;
calculating a enhanced torque bias ratio value based at least in part upon the theoretical standard torque bias ratio value and the lateral acceleration based scaling factor;
determining a first control authority for a first controller based upon the enhanced torque bias ratio value, the first controller being configured to facilitate steering of the steerable rear wheels;
determining a second control authority for a second controller based at least in part upon the enhanced torque bias ratio value, the second controller being configured to facilitate distribution of torque among the steerable rear wheels;
varying each of the first control authority and the second control authority in response to a change in the enhanced torque bias ratio value; and
controlling the steering and the distribution of torque of the steerable rear wheels in response to the first control authority and the second control authority.

* * * * *